C. E. McCLAY.
WIND DEFLECTOR FOR VEHICLES AND PROCESS OF MAKING THE SAME.
APPLICATION FILED NOV. 13, 1919.
1,367,527.
Patented Feb. 1, 1921.
2 SHEETS—SHEET 1.
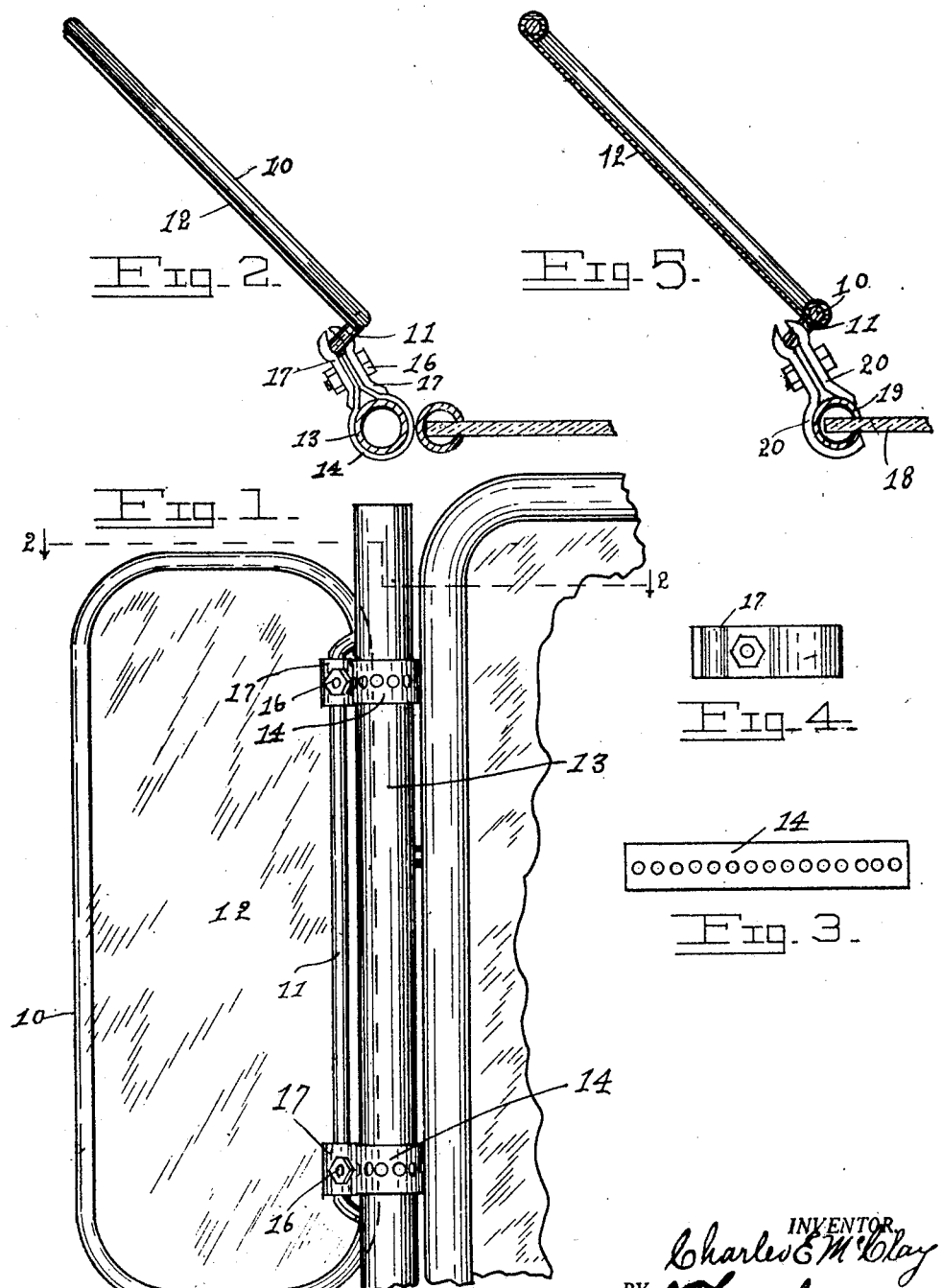

C. E. McCLAY.
WIND DEFLECTOR FOR VEHICLES AND PROCESS OF MAKING THE SAME.
APPLICATION FILED NOV. 13, 1919.

1,367,527.

Patented Feb. 1, 1921.
2 SHEETS—SHEET 2.

INVENTOR,
Charles E. McClay
By [signature]
ATTORNEY.

UNITED STATES PATENT OFFICE.

CHARLES E. McCLAY, OF LOS ANGELES, CALIFORNIA.

WIND-DEFLECTOR FOR VEHICLES AND PROCESS OF MAKING THE SAME.

1,367,527.  Specification of Letters Patent.  Patented Feb. 1, 1921.

Application filed November 13, 1919. Serial No. 337,785.

*To all whom it may concern:*

Be it known that I, CHARLES E. McCLAY, a citizen of the United States, residing at the city of Los Angeles, county of Los Angeles, State of California, have invented new and useful Improvements in Wind-Deflectors for Vehicles and Processes of Making the Same, of which the following is a specification.

My invention relates primarily to automobiles, and the object thereof is to provide a wind deflector which is detachably connected to the end of the windshield or to the back of the front seat or to both which when in one position will deflect the wind to prevent its entering the front and rear portions of the vehicle and in another position will deflect the wind to cause it to enter the front and rear portions of the vehicle.

Figure 6:
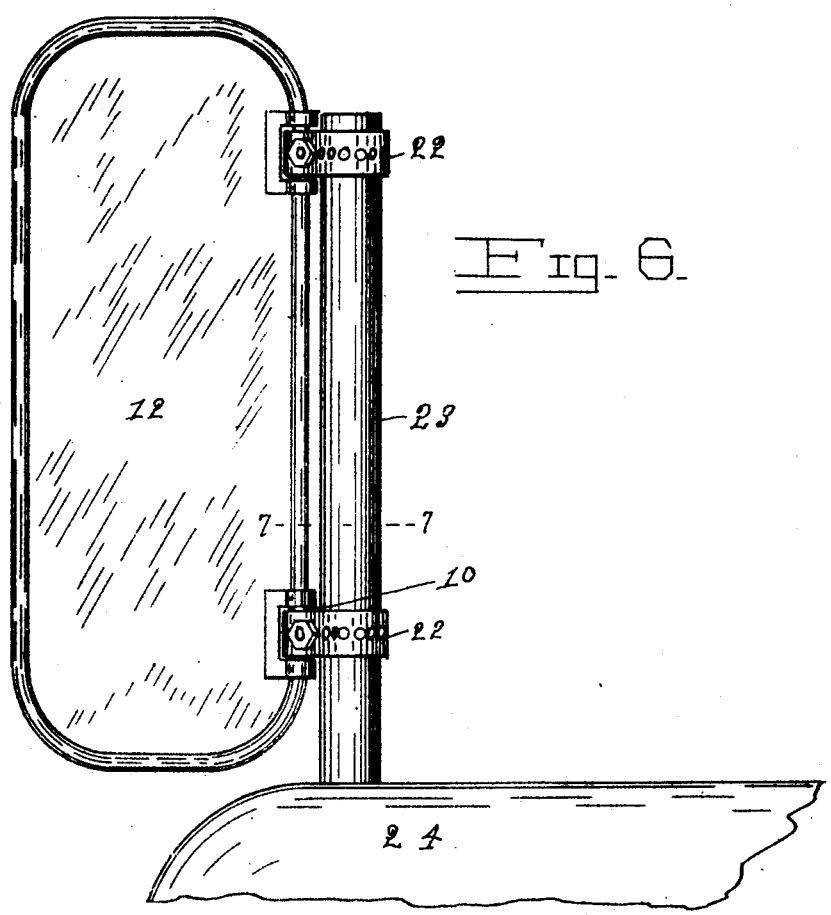
Figure 7:
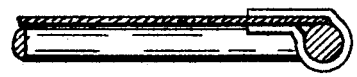

In drawings forming a part of this application Figure 1 is a front view of a fragment of a windshield with a wind deflector secured thereto in position to deflect the wind to prevent its entering the front of the vehicle. Fig. 2 is a top plan of the deflector with the windshield in section on the line 2—2 of Fig. 1. Figs. 3 and 4 are side views of the parts of the clamp shown in Figs. 1 and 2. Fig. 5 is a cross section of the deflector with an edge view of a modified form of clamp to secure it to the windshield, a fragment of which is shown in section, also of modified form. Fig. 6 is a modification showing the shield attached to the back of the front seat, a fragment of which is shown. Fig. 7 is a fragmentary section on the line 7—7 of Fig. 6 the clamp and seat being omitted.

When attached to the windshield my deflector consists of a frame preferably of heavy steel wire 10, in shape preferably a parallelogram with rounded corners. An attaching bar 11 also of wire and U-shaped is secured to the frame near the ends. The frame is first coated with a solvent such as celluloid dissolved with acetone, and the coating is allowed to dry. A sheet of celluloid 12 or other transparent material, is then clamped to the frame and a solvent is applied to the frame and sheet at their engaging points and allowed to dry. When the clamps are removed and the sheet is trimmed the deflector is ready to be attached to the windshield post 13. With most windshields the deflector may be secured thereto by the clamps shown in Figs. 1 to 4. This form of clamp consists of a perforated strip of sheet metal 14 which is adapted to be passed around the windshield post 13 and to be secured thereon by bolt 16 which also passes through side members 17 whose outer ends are cupped to receive and retain rod 11 against turning therein when the deflector is positioned on the post and which have holes therein for bolt 16. The rear ends are slightly spread apart so as to bear against strip 14 as it leaves post 13. It will be understood that it requires two of these deflectors, one at each end of the windshield and two clamps for each deflector, one at the top and the other at the bottom of bar 11. Where the windshield pane 18 enters post 19 as shown in Fig. 5, strip 14 is omitted, and I make one of the side members 20 longer than the other and curve the rear end to partially encircle post 19. By this construction it will be seen that I have provided a simple cheap and efficient wind deflector which can be attached to a windshield as shown in the drawings to deflect the wind so that it will not enter the front portion of the vehicle when it is in motion.

It sometimes happens that the weather is warm and it is desirable to have the air enter the front portion of the vehicle. In such case the deflector is then turned to project angularly to the front of the windshield, thereby catching the air and deflecting it into the front portion of the vehicle.

In Figs. 6 and 7 I have shown a slightly modified form which is adapted to be used upon the back of the front seat to prevent the air from blowing against the occupants of the back seat. In this form the frame is constructed and covered with celluloid or other transparent material as in the other form but the attaching bar 11 is omitted. Near the top and bottom and on one side of the frame I cut away the celluloid and reinforce or protect the cut edges by a sheet metal strip 21 which also passes around frame 10. Clamps 22 of the preferred form pass around post 23 secured to the back of the front seat 24 and are secured upon frame 10 at the cut away portions of the celluloid sheet. This deflector can be turned to deflect the air away from or to the occupants of the rear seat as desired.

Having described my invention I claim:—

1. The herein described process of forming wind deflectors which consists of forming a metal frame; then coating said frame with celluloid dissolved in acetone and permitting the coating to dry on the frame, whereby the frame is coated with celluloid; then clamping a sheet of celluloid to the frame; then applying to said sheet and frame at their engaging points a solvent, whereby said sheet and frame are united when the solvent is dry; then after the solvent is dry removing the clamp and trimming away the projecting edges of the sheet.

2. A wind deflector for vehicles provided with windshields, comprising a metal frame having a U-shaped atttaching bar secured to one side thereof, said attaching bar being integral with said main frame; and a sheet of transparent material secured to said frame substantially as described herein.

3. A wind deflector for vehicles provided with windshields comprising a metal frame having a U-shaped attaching bar secured to one side thereof said attaching bar being integral with said main frame; and a sheet of transparent material secured to said frame substantially as described herein, in combination with clamps adapted to secure the same to the windshield of the vehicle.

4. A wind deflector for vehicles provided with windshields comprising a metal frame having a U-shaped attaching bar secured to one side thereof, said attaching bar being integral with said main frame; and a sheet of transparent material secured to said frame substantially as described herein; clamps, adapted to secure said deflector to the windshield, said clamps comprising a perforated post encircling member; said members having cupped outer ends; and a bolt passed through said side members and said perforated member.

In witness that I claim the foregoing I have hereunto subscribed my name this 6th day of November, 1919.

CHARLES E. McCLAY.